(12) United States Patent
Nerby (10) Patent No.: US 11,809,793 B2
(45) Date of Patent: Nov. 7, 2023

(54) WELL FLOW SIMULATION SYSTEM

(71) Applicant: Roxar Software Solutions AS, Stavanger (NO)

(72) Inventor: Gudbrand Nerby, Nesbru (NO)

(73) Assignee: ROXAR SOFTWARE SOLUTIONS AS, Stavanger (NO)

( * ) Notice: Subject to any disclaimer, the term of this patent is extended or adjusted under 35 U.S.C. 154(b) by 0 days.

(21) Appl. No.: 16/957,978

(22) PCT Filed: Jan. 3, 2019

(86) PCT No.: PCT/EP2019/050101
§ 371 (c)(1),
(2) Date: Jun. 25, 2020

(87) PCT Pub. No.: WO2019/134941
PCT Pub. Date: Jul. 11, 2019

(65) Prior Publication Data
US 2020/0333506 A1 Oct. 22, 2020

(30) Foreign Application Priority Data
Jan. 5, 2018 (NO) .................................. 20180019

(51) Int. Cl.
*G06F 30/28* (2020.01)
*G01V 99/00* (2009.01)
*G06F 113/08* (2020.01)

(52) U.S. Cl.
CPC ............ *G06F 30/28* (2020.01); *G01V 99/005* (2013.01); *G06F 2113/08* (2020.01)

(58) Field of Classification Search
CPC ... G01V 99/005; G06F 30/28; G06F 2113/08; G06F 30/20; E21B 41/00; E21B 41/0035;
(Continued)

(56) References Cited

U.S. PATENT DOCUMENTS 7,672,818 B2    3/2010   Watts, III
8,073,665 B2 *  12/2011  Watters ................... E21B 43/00
                                                     703/10

(Continued)

FOREIGN PATENT DOCUMENTS

CN    102803651    11/2012
CN    103136701    6/2013
(Continued)

OTHER PUBLICATIONS

Song Cunyong, Influencing Factor Analysis of Condensate Gas Pipeline Liquid Loading Based on OLGA Transient Simulation, Jun. 13, 2017, Oil-Gas field Surface Engineering vol. 36, No. 4, pp. 14-17, Abstract only.

(Continued)

*Primary Examiner* — Steven W Crabb
(74) *Attorney, Agent, or Firm* — PEARL COHEN ZEDEK LATZER BARATZ LLP (57) ABSTRACT

The present invention relates to a system and method for modelling flow conditions in a well system, the well system being represented by a number of branches (1,1a) conducting hydrocarbons from at least one branch entry point (3,3a) to a branch exit point (2), at least one of said branches constituting a global well system exit point, wherein each branch has a branch entry point (3,3a) being provided with a least one flow inlet (4) and being related to known boundary conditions and with a input flow control unit (7) being related to adjustable flow characteristics for controlling the flow through said input, said boundary conditions including predetermined data concerning at least one of pressure, temperature and flow at said input flow control unit, and said branch conduit includes an branch flow control unit (6), having adjustable flow characteristics for controlling the flow through the branch.

4 Claims, 3 Drawing Sheets

(58) Field of Classification Search
CPC ...... E21B 43/12; E21B 43/14; E21B 41/0092; E21B 41/0099
See application file for complete search history.

(56) References Cited

U.S. PATENT DOCUMENTS

| | | |
|---|---|---|
| 9,212,538 B2 | 12/2015 | Shetty et al. |
| 2007/0112547 A1* | 5/2007 | Ghorayeb ............... G06F 30/20 703/10 |
| 2014/0207430 A1 | 7/2014 | Li et al. |
| 2015/0025858 A1 | 1/2015 | Kulkarni et al. |
| 2016/0098502 A1* | 4/2016 | Havre .................... G06F 30/20 703/9 |
| 2018/0320504 A1* | 11/2018 | Gunnerud ............... E21B 43/00 |

FOREIGN PATENT DOCUMENTS

| | | |
|---|---|---|
| CN | 103459755 | 12/2013 |
| CN | 105089582 | 11/2015 |
| CN | 106194117 | 12/2016 |
| EP | 3002409 A1 | 4/2016 |
| WO | WO 2009/024545 | 2/2009 |
| WO | 2009114248 A2 | 9/2009 |
| WO | WO 2013/192516 | 12/2013 |

OTHER PUBLICATIONS

Office Action for Chinese Appl. No. 201980007253.2 dated Sep. 23, 2021.

\* cited by examiner

WELL FLOW SIMULATION SYSTEM

The present invention is a U.S. National Stage application of International Patent Application PCT/EP2019/050101, filed on Jan. 3, 2019, which claims priority from Norwegian Patent Application No. NO20180019, filed Jan. 5, 2018 and granted as NO344235B1, incorporated herein by reference.

The present invention relates to a system for controlling flow in a system of wells, flow lines, risers and spool pieces.

The presented invention is related to an algorithm to calculate flow, pressure and temperature included energy supply and losses in networks of hydrocarbon and eventual added glycols or power fluids in wells, spool pieces, pipelines and risers. Network "branches" are common abstractions of pipework facilities representing wells, pipelines, spools, risers, with distance coordinates (Branch model). East and west is consequently used as direction and boundary definition. A branch is a physical device of pipe material with geometry parameters, transferring fluid from east to west or from west to east. WO2009/024545 describes a single branch adapted to control input and output of the branch while WO2013/192516 describes means for evaluating flow in a branch assisted by user input. The algorithm according to this invention is developed to handle single or multiple flow networks with unlimited number of branches. A flow network branch mesh (Network model) consists of branches connected at junctions. Junctions are defined as internal within the network and external for the far east and far west boundaries. Basic constitutive equations for mass, pressure, energy within the network branch mesh is a fundamental basis the invention.

The flow networks are divided into "layers" dictated by junction nodes connecting branches from far west, representing the individual well inflows, ending at the far east boundaries, represented by the individual terminals with either flow, pressure and/or temperature defined. External boundary conditions of the network branches are defined from either external reservoir flow models, production field In-situ sensor data, static data from tables, data bases or by defined versus time by human individuals.

The invention is related to the oil and gas upstream industry. The motivation for the invention was to establish a flow simulator for multiphase and mono phase flowing network with operational realistic actuators (choke valves, pumps, compressors) controller facilities. The invention can be used to forecast production performance and to aid daily field calculations from sensor monitoring as part of production optimization issues. The benefit of the invention is better planning, more accurate feasibility studies, and improve operation of oil and gas production fields with respect to economy and safety.

Special solver logics are used to handle discontinuities and non-linearity in flow pressure relations while handling actuator controllers coincide with real life situations. Large single or multiple networks can be handled since efficient sub network processing and memorial principles give efficient use computer memory and processors.

Existing flow assurance software products apply mass, momentum and energy equations discretized into difference coefficients sparse band matrixes. The solvers are dependent on if the characteristics of equations are whole or partial parabolic, elliptic or hyperbolic, apart from clean parabolic, leading to large computer effort. The inverted matrixes result in linear approximated pressure versus flow field assigned to the branch network nodes. One example showing such a system is in U.S. Pat. No. 7,672,818. Large flow networks require large matrixes and iterative calculations from discontinuities and the decoupling and sequential handling of pressure, mass momentum and energy constitutive equations. The traditional methods require large computer efforts and to get reasonable forecasting. Discontinuities in the balance equations and ill conditioned numerical models leading to unstable and false solutions is likely. One known solution to cope with this is discussed in U.S. Pat. No. 9,212,538 which use subsystem modules and matrixes.

The presented invention uses established fundamental mass and momentum balance equations methods. However, the key part of the invention represents algorithms to handle strong inhomogeneity of the reservoir deliveries into wells and discontinuities in flow pressure relations during flow versus pressure calculations along the network trajectories. Pressure bands are predicted for the individual actual well operational ranges at time basis to define conditional limited max and min pressure allowing flow. The limited well pressure band is also dependent on available pump/compressor performance and power fluid. The algorithm memorizes versus time pressure versus flow relations on each junction, updated from solved pressure versus flow relations at junctions from previous time results. Pressure independent partial network and classified and memorized to enhanced partial network calculations to increase calculation speed and reduce computer load. The solver exchanges relevant messages between the upside and downside layers of the sub networks to aid necessary information on each network layer target values and types, accuracies for object function, actual branches responding to the local layer constraints, and if there are pressure limited wells and switches to allow weak wells to first try survival or if not possible, close weak wells.

Therefore, it is an object of the present invention to provide a system and method which can optimize flow in a branched system in an easily scalable way. The object is achieved as presented in the accompanying claims.

The present invention provides simulation principles for use in steady state and transient conditions. The physics include mono- and multi-phase flow models. The method calculates flow versus pressure in networks without requiring linearity. It employs learning logic to increase calculation speed or performance. The method allows simulation of large flow networks within reasonable time. The system fundamentals are described in general terms without focus on detail.

The invention will be described below with reference to the accompanying drawings, illustrating the invention by way of examples.

Figure 1:
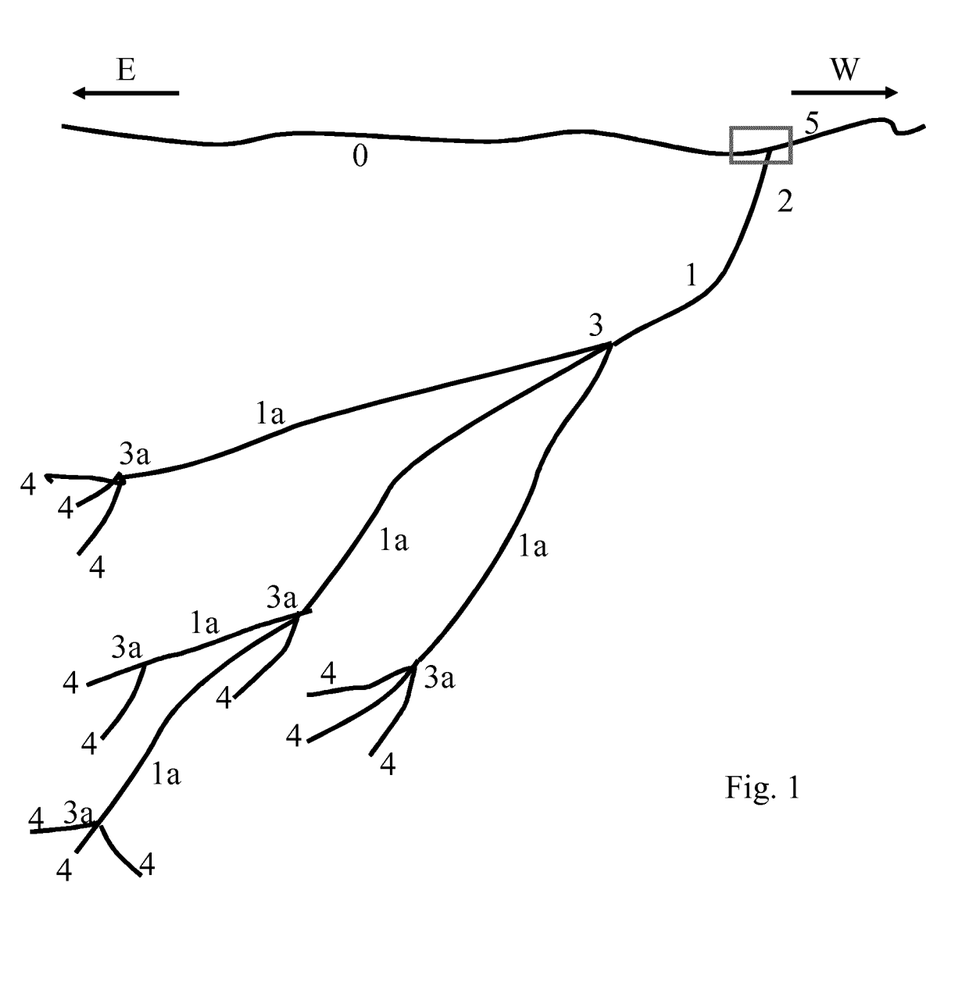
FIG. 1 illustrates an overview of a network production system

In FIG. 1 a production system is schematically illustrated as a branch 1 with an exit point 2 connected to the topside system 5 e.g. at the surface 0, in the west W according to the common terminology of the field, receiving the hydrocarbons from the geological formations. The other, lower end of the branch 1 has an entry point 3, 3a being a node connected to many flow inlets 4 in the eastern part E of the system according to the terminology. The flow inputs may be connected in a series to other branches 1a or to the geological formation producing the fluids through the inlets 4.

Figure 2:
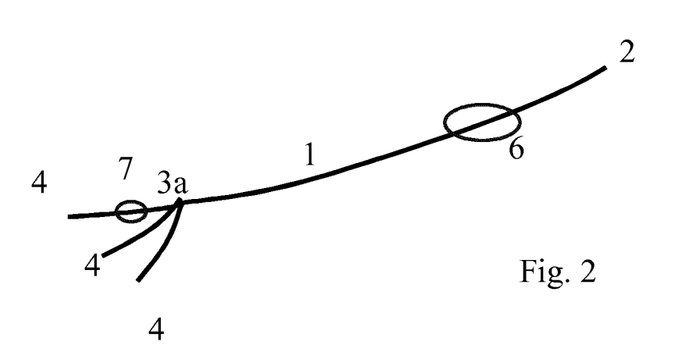
FIG. 2 illustrates one branch in a system as illustrated in FIG. 1.

In FIG. 2 one branch 1 is illustrated having the exit point 2 and node entry point 3, and a number of flow inlets 4. As mentioned above the flow inputs at the entry point 3 may be acting as a junction to either other branches 1*a* or be directly connected to the inlets 4 at the geological formations where the production fluids including the hydrocarbons in the formation enter into the well system.

The flow inputs or inlets 4 may preferably also include flow control units 7 such as valves for closing or limiting the flow into the system.

The branch 1,1*a* will preferably also include a branch flow control unit(s) 6 like valves, flow limiters and/or pumps or compressors and/or other relevant items like gas lift for regulating the flow and the pressure in the branch. It may also include heat sources and/or sinks for temperature control. The flow control units 6,7 may be individually used for controlling the pressure/flow conditions in each branch and at entry point to the system inlets 4.

In a well system a number of sensors may be included at selected positions, e.g. at flow inlets 4, in the control units 6,7 and in the branches 1,1*a*, providing current data regarding the well system, and report the sampled information to a main control unit 5, usually positioned outside the well including computers for performing the calculations for executing the invention.

The method according to the invention defines network levels starting at the terminal boundaries (far) east (e) node 3 and inlet 4, going at west (w) direction, defining a layer (l) for each upstream branch junction connecting branches 1,1*a* until arrival to well boundaries inflow at (far) west 5. One or more source branches from west to a branch junction, and parallel branches from west to east of junction are feasible. Optional defined multiple flow networks may or may not exchange mass and energy and may or may not have pressure continuity at any levels at other level of the networks. The network branch to branch connection may be redistributed (re-routed) or the network junction connections can be changed during runtime by conditional event handling commands.

Branches 1,1*a* include "primary elements" (elements) or control units influencing the flow, being identified in the system. The elements or control units 6 may be pipe segments, pumps, compressors, well inflow items, inflow sources, outflow sinks, separators, splitters, heaters, coolers, choke valves, convergent divergent measurement nozzles (CDMN), pumps, compressors. Balance of energy is applied on pipe segments, choke valves, power facilities where flow versus pressure implies dissipation energy losses or pressure increase from rotary power facilities. An item is defined as a controllable element used as an actuator. Not active elements are pipe segments, splitters, separator, CDMN and optional sources/sinks. However, sources applied as power fluid can be applied as an active item.

Total masses between west-east boundaries of the elements are balanced in element types sources/sinks, phase flow splitters, and phase separators. Mass sinks can be routed to other branch junctions 3 as sources or at branch source elements in current or parallel networks or can be sent out of network without a specific destination. Mass source element in a branch can be received at junctions 3 from sink elements in one or more branches at a network or from parallel networks, or from nowhere as an external input phase specific source inlet 4.

The primary elements heaters and coolers are latent heat responders to balance satisfy temperature targets and constraints in the network.

Physical volumetric, rheological and thermal fluid phase properties (Fluid models) are defined from relevant correlations or predefined pressure versus temperature tables based on existing industrial known formats.

The method allows conditionally setting of initial and boundary conditions, activating and deactivating control units such as items, sensors, reset of item parameters, rerouting branches between junctions or rerouting of branches to dedicated sources in other branches, redefining well branch types between production or injection configuration, reconfiguring physical fluid model templates, reconfiguring network setup, setting other vital parameters relevant for the simulation processes. Target/constrains can be defined at junction 3, at an item element, and at a sensor position along a branch trajectory. The controllers of each control unit can be set to manual, PID or in direct predict mode.

The active primary elements 6,7 are actuators representing controllers with max/min/target (constraint) set points of either phase flow, pressure or temperature at junctions, sensors or items to ensure approach actual constraints. The controller logics facilitate actuator setting representing minimized energy loss with respect to defined targets and constraints, representing the overall goal for the invention, what is synonymous with optimized of flow.

Numerical models are used to calculate flux and potential variables across the elements branches, sub networks and complete networks. Mass fluid phases, momentum and energy balances at junction boundaries are ensured. Mass, pressure and thermal transfer between adjacent branch networks is enabled by the models.

The system according to the invention may also include a user interface as well as open files to define required setups and to carry out relevant network flow simulations.

The user may then define branches, network incidences, items, controllers, fluid systems. Key parameters are targets, constraints at junctions, sensors or at items. Recommended accuracy parameters for pressure, flow temperature is applicable target and constrains.

Controller set up/definitions established for actuators combined with max/min/target (constraint) setpoints with relevant controller parameters, dependent on if controller is manual, PID or Direct. A direct controller is an actuator calculating direct steady state the response to satisfy the actual target. PID control is related to dynamics of the process and the actor itself.

A chronological event base structure is used to set any relevant parameter related to items, boundary constraints (conditions), time step limits, activating and deactivating items, open close wells, converting wells between injector and producers, setting accuracies, reroute or reconfiguration branches of network, reconfigure items, simulation terminating criteria. All this can be set initially and during run time. This input combined with the external data streams represents the complete input for a simulation and delivery of results for a simulation case.

Input data received is from external reservoir simulators, offline or real-time measured from sensors or pre-simulated, event based input, from OPS servers or static data bases represent the complete set of boundary condition versus time.

Results may be locally stored for online or offline display/storage, and also exchanged to external applications dependent on the actual simulation purpose, if simulation is offline or at real time.

The case parameter setup and inlet data may be controlled in logical check outs related to the known information about the well system. Improper setup or inappropriate input data streams may lead to error messages and case run termination.

The branch to branch connection 3 in the networks are preferably sorted in layers in direction from far west side open junction boundaries layer (ln) up to the far east open terminal junctions layer (l1) constituting a number of network trajectories.

The network trajectories are subdivided into multiple sub pressure networks without pressure influence related to other branch trajectories. In the sub networks the flow, pressure temperature equations solver can work sequentially or in parallel.

Interface/exchange of mass or pressure continuity to eventual parallel networks are sorted out for the solver subnetwork management.

The Network layers of each sub pressure network from west to east is used to define calculation order of the branches.

A message transmission structure is defined to serve two-way relevant solver information between the sub network layers. The message structure constitutes a communication system informing about flowing branches (part of sub network) into a layer, the actual constraint properties, position of the constraints (junction, sensor, item), type of constraints (max, min, target), accuracies, the actual constraint values. Constraints are optionally phase flow, velocities, pressure, temperature.

A limit max/min outlet pressure is predefined to constrain the pressure field range for each branch or sub network. These may be set by users or defined by the well inflow performance per well. When the junction pressures cross these limits for actual constraints, wells cannot flow when these limits cannot be satisfied.

The branch calculation order follows the stream directions from local layer defined as west side 5, in east direction until arrival to a floating/fixed junction 3 or internal or item or sensor target/constraint 4,6,7. Initial sequence starts at the far west layers. Calculation of the subnetwork through branches from far west to the actual layer is carried out, sequentially per layer through the branches until arrival to the far east layers. The upstream branches of subnetwork, the actual variable type (pressure, flow, velocity, temperature), constraint type (max, min, target), actual accuracies and constraint values are stored in the message box delivered to the solver. The message box at current layer is transferred between the higher and current layers during the solver procedure. A reference junction pressure field is stored at branches of the current subnetwork from far west until the current layer were the actual position for the actual constraint branch at item, sensor or junction. The east and west reference pressures are constant during the solver process. The pressure references are reset on the actual branches into the actual layer after converged and accepted solution.

The initial deviation at a layer from the local constraint will predict a start pressure correction xle at the local east level (lc), starting/trigging the solver which may use the control units 6,7.

The initial xle is estimated from the actual variable type (pressure, flow, temperature) or retrieved from previous time solvers. While transverse to increasing layers in direction west, the network junction pressure field is calculated from the local terminal east layer (lc). There are parallel and serial layers given from number of junctions and actual flowing branches delivering into a given layer. The layers are west side incrementing lc, lc+1, lc+2, . . . ln, were "ln" represents a well inlet as a far west layer. Each layer is tied together by the west (Jlw) and east (Jle) branch junction 3 of the layer l. The pressure increment relation between the east and west junctions are established from historic data and current flow versus time. The function solver searches for available active actuators at each layer during transverse in direction west. When active actuators or control units 6,7 are available, the transvers of layers go from west to east until arrival to the local layer where the constraint trigged the calculations. If no other actuators is present at west, the well inflow is responding, returning to west. The west east transverse is repeated until the actual constraints is satisfied.

The control of actual actuators 6,7 at a network level apply some base rules, relevant for injection and production conditions.

Use of power above min power is not allowed if choke vales are throttled in any layers from targets.

Open valves to max position before power is used.

Close power fluids before choke valve throttle is allowed.

Engage power fluid only if choke valves at max positions.

Allow choke, power, power fluid to satisfy internal level targets/constraints, while adjust well inflow with partially fixed actuators to satisfy terminal far east targets.

If subnetwork is on status target flow, at least one choke actuator at max position allow use of power.

If more than one choke valve is less than max position, power is not allowed to be used.

Manual controllers are not allowed be used as active actuators

PID controllers are reset between timestep, but is treated as manual controller during solver at the time step.

Multiple targets at a level will have priority in target pressure before target flow or max/min pressure or flow.

Constrains variable of type temperature can only activate latent heat from heaters or coolers.

Power devices apply optionally vendor defined head versus RPS and flow performance.

The solver defines a one variable fundamental gradient driven equation solver Fun( ) which is a hybrid method in close relation to Golden Search, Cord method, Newton Raphson or equivalent with nonanalytic function gradients.

This function is recursive used for all layers of the flow network(s). Fun( ) has reset ability to handle discontinuities and nonlinear object functions. The function has a reset option which is activated when discontinuity conditions appears or a reset command is received from the object function search. Reset of function is required when a pressure range cannot satisfy solution without close wells or add energy, if new free variable responder is required to satisfy the object function, or if target position is changed from junction to sensor or to item target and vice versa during the variable search. The free variable of the equation solver is defined as a pressure responder predicted from either well inflow, power facilities, choke valves, or mass gravity reduced sources (gas lift, jet pumps power drive fluids), when the actual constraint variable is pressure or flow since these parameters all influence on the pressure field.

Latent heat from heaters or coolers has negligible impacts on pressure field and is not allowed to be used for pressure constraints. Latent heat from coolers/heaters is allowed related to temperature constrains only.

Algorithm Sequence

At the network layer were the solver is trigged, a constraint of type max, min, target defines "valconle", which is either flow, velocity, pressure or temperature, sited at junction, item or sensor in the branch at the current layer "l" at east (e).

The dependent variable xle represents pressure correction at east side at layer l, or xle represents latent heat in case of temperature targets.

dxle is a differential to xle, used during the local solver on each layer in funle( ).

The task is to calculate xle minimizing funle( ).

For the east layer trigging the solver, the object function funle(xle) is defined from the actual local flow/pressure temperature target, defined here as valconle, at junction, sensor or item, dependent on what position were the constraint trigged the calculation, the current calculated value is "valcalcle".

funle(xle)=valconle−valcalcle valcalcle is the equivalent calculated property at the position where the constraint value valconle is defined. The constraint is either flow, velocity, pressure or temperature. For layers>1, the local object function is always related to the differences in local and calculated east pressure junction pressure corrections, independent on the original target type and position at the level triggering the solver.

A heat exchanger in upstream layer is required to satisfy a temperature target in the network. Without active coolers/heaters, any temperature target/constraint satisfaction will be omitted/bypassed. Pressure field correction has generally weak influences on eventual temperature constraints.

The recursive solver transverse from east to west layers and back to east is continued until xle results in solved function is obtained within required accuracies.

From here, the algorithm repeats for each layer, from the start layer lc, down to the far west network layer, or until adequate actuators in the increasing layer chains:

Set subnetwork members from layer i down to far west, set local constraint (pressure, flow, temperature), constraint type (max, min, target), position is junction, sensor, or item at local branch at level l, accuracies, current calculation related to the actual constraint.

The function is recursively called until far east or actuator found.

The numerical method used according to the invention is developed to calculate flow in networks based on a recursive architecture. The method finds optimized converged solutions with respect to flow and pressure within defined tolerance limits. Controller facilities are included to get an optimized solution reflecting minimum use of external energy and chemical injection needs. The method stores relevant data between network junctions and apply this information to increase calculation speed. The recursive schematic allow calculation on large flow network without computer storage limitations. The nonlinear nature of pressure versus flow is considered.

This way the system can simulate large networks using realistic operational conditions within reasonable times accounting for nonlinear behavior, It relies on a data storage and data exchange functionality to interface (get and send) data to and from external environments (external "slaves") and to store input and calculated values for branches, active items and sensors. The core concept of the system is the flow versus pressure solver method. The required GUI, data storage, and data in and out handlers are included to manage complete case scenarios.

Usually a verification of the system setup is carried out to validate the model setup and report warnings or errors related to unfavorable settings or improperly defined boundary conditions. Events are executed and initial boundary flow, pressure temperature conditions are defined for relevant junctions as well as internal branch targets and/or maximum and minimum constraints. When referring to existing wells the boundary conditions may be based on assumptions or reflect knowledge about the geological conditions as discussed above.

Figure 3:
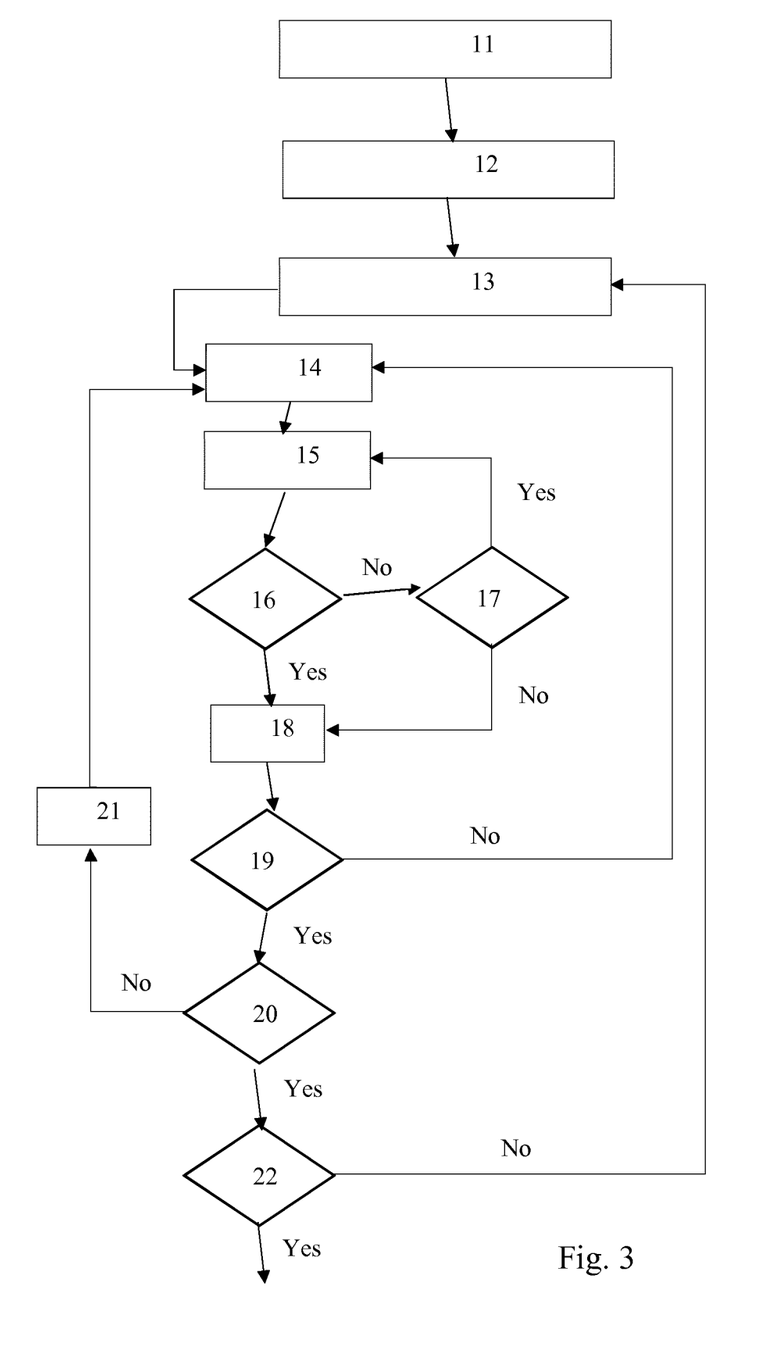
FIG. 3 illustrates a simplified flow chart of the preferred embodiment of the invention.

An overview of the method according to the invention is illustrated in FIG. 3, where the following steps are shown:

11. Set boundary data for current time. When used in relation to a well system these may be based on measurement from sensors positioned in the relevant part of the well system or previously known conditions
12. Initiate system and set required parameters. These may include parameters such as required output flow and pressure from the well system or a selected sub-system.
13. Select sub-pressure system, as representing a first branch or branch system.
14. Select next branch in sub-pressure system and determine target values of free variable to use for obtaining the required parameters for that sub-pressure system. The free parameters may be the available adjustment range for pressure and flow at the branch inputs.
15. Calculate response from current boundary conditions.
16. Is the response within the available range of the free parameters?
17. If No, are there other free variables to use?
18. Set state information to transfer to next branch connected to the first, e.g. represented by the resulting calculated output parameters or necessary input parameters of the branch.
19. Terminal branch in sub-pressure system?
20. Is the boundary conditions for the system met?
21. Adjust target values.
22. Have the calculations been completed for all sub-pressure systems in the well system? If yes, finish.

This recursive method and system according to the invention thus builds a model of the flow conditions in a well system by modeling one branch at the time, and moving back and forth between the branches adapting the conditions at the models representing the flow controllers and branches within the available ranges until an operable model is achieved or a selected stop point for the calculations is reached.

To summarize the invention utilizes a recursive solution scheme for mono and multiphase pressure flow solution, transverse between a terminal west side first network layer and the far east layer correcting junction pressure field within one recursive function to satisfy local and terminal targets or constraints of type flow, pressure and temperature.

During simulation apply pressure limits for well flow to interact with the solver to reset pressure versus flow calculation to primarily avoid well closes, or if needed close wells and repeat calculation automatic during the equation solver processes.

A memory functionality of flow versus pressure at each junction to adapt fast execution of junction pressure versus flow.

Apply implicit actuator controller in the layer to reset the target for max/min constraints during equation solver to auto select relevant free variable to satisfy the internal and external targets and constraints.

Apply branch pressure chains within a main flow network allowing parallel processing of sub network to handle large flow networks.

In the modelling system the well system represented by a number of branches (1,1a) conducting hydrocarbons from at least one branch entry point (3,3a) to a branch exit point (2), at least one of said branches constituting a global well system exit point.

Each branch has a branch entry point (3,3a) being provided with a least one flow input (4) and being related to known boundary conditions and with an input flow control unit (7) being related to adjustable flow characteristics for controlling the flow through said input, said boundary conditions including predetermined data concerning at least one of pressure, temperature and flow at said input flow control unit.

The branch conduit includes a branch flow control unit (6), having adjustable flow characteristics for controlling the flow through the branch.

The system control unit is, based on the boundary conditions and known flow conditions, adapted to calculate the flow at each input point and through the branch according to said boundary conditions and selected flow conditions in at least one of said inputs, branch and branch exit point. The system is also adapted to calculate a model based on said boundary conditions including selected flow characteristics at each input point and branch providing a selected flow output.

Preferably the system includes at least two branches connected in a series where at least one of said flow inputs at the entry point of a first branch is coupled to an exit point of a preceding branch also constituted by one of said branches.

At least one of said flow inputs may be an inlet from the surrounding geological formation, where the boundary conditions based on sensors such as means for measuring the pressure, temperature and flow through said point.

The present invention is especially advantageous with the branches constituting a network of branches at least part of which being connected exit point to input point is a series, including a number of flow input points coupled to the surrounding geological formation, the system control unit being capable of controlling said branch and input control units so as to provide a predetermined output at said global well system exit point. In this case the system control unit is adapted to recursively control, calculate and balance the flow conditions in each branch for obtaining said predetermined output.

The method for controlling a system as described above providing a predetermined set of values such as required output flow and pressure from the well system the method includes calculating for each serially connected branch the input values of the branch corresponding to the exit values of the branch, starting at the global output value, and adjusting the target values of the flow controllers for the inlet or branch characteristics for obtaining said predetermined global exit values. If a limitation in the boundary conditions and adjustment range for the flow controllers does not provide a realistic solution the previous branch is recalculated with a new set of conditions and adjustments, after which the limited branch is recalculated based on the adjustments in the previous branch.

Alternatively, the method may be based on measuring the input values at branch inputs constituted by inlets from a geological formation, and, for each branch serially connected from said first inputs and based on the branch characteristics, so as to calculate the output conditions of the well and thus if it is possible to produce for example hydrocarbons from the well under those conditions. Again, the method is recursive and may adjust the flow controllers according to new targets values so as to optimize the pressure and flow through the well to increase the well output. In this method it may be advantageous to at each entry point, initially define the pressure value is defined as the pressure at the lowest input.

The invention claimed is:

1. System for modelling flow conditions in a well system, the system comprising:
   a system control unit; and
   a data storage configured to store a representation of the well system, the representation of the well system comprising:
   a plurality of branches, each branch conducting fluids from a respective branch entry point to a respective branch exit point, wherein there is at least one branch entry point and at least one branch exit point, wherein for each branch in the plurality branches:
      each branch exit point having one or more known boundary conditions of pressure, temperature, flow, or any combination thereof;
   a plurality of branch flow control units, each of which is coupled to a unique branch of the plurality of branches, to adjust the flow of the fluid through the plurality of branches and flow inlets, wherein at least two of the plurality of branches has one or more constraints or one or more targets;
   the system control unit being adapted to:
   for each of the plurality of branches, calculate a flow at each input point and through the branch based on the respective boundary conditions and selected flow conditions in at least one of the plurality branch entry points, plurality of branches, and plurality of branch exit points;
   control the plurality of branch flow control units to cause the respective plurality of branches to reach their respective one or more constraints or one or more targets,
   for each of the plurality of branches, recursively transverse from east to west and west to east through the plurality of branches to determine, i) the flow in each branch, and ii) balance flow conditions at the inlets and outlets of each branch while continuing to meet the respective one or more constraints or one or more targets and optimize flow until the flow conditions are balanced or a maximum number of traversals are made, wherein at each branch where one or more constraints are to be met, an iterative solver is employed, and wherein the system is configured to build a model of the flow conditions based on the flow calculated for each of the plurality of branches and their respective branch entry point and branch exit points.

2. The system according to claim 1, wherein the system control unit is further adapted to:
   determine a predetermined set of values at the global exit point, for each serially connected branch calculating the input values of the branch corresponding to the exit values of the branch, starting at the global output value, and adjusting said input values or branch characteristics for obtaining said predetermined global exit values.

3. The system according to claim 1, wherein the system control unit is further adapted to: determine the global exit values of the plurality of branches, including measuring the input values at branch inputs constituted by inputs from a geological formation, and, for each branch serially connected from said first inputs and based on the branch characteristics.

4. The system according to claim 1, wherein at each input, the pressure value is defined as the pressure at the lowest input.

* * * * *